Nov. 25, 1958 — J. J. LIHOTA — 2,861,844
BRAKE CYLINDER PRESSURE RETAINING AND MAINTAINING APPARATUS
Original Filed May 29, 1951 — 2 Sheets-Sheet 1

INVENTOR.
Joseph J. Lihota
BY
Adelbert A. Steinmeier
ATTORNEY

Nov. 25, 1958                J. J. LIHOTA                2,861,844
BRAKE CYLINDER PRESSURE RETAINING AND MAINTAINING APPARATUS
Original Filed May 29, 1951                              2 Sheets-Sheet 2
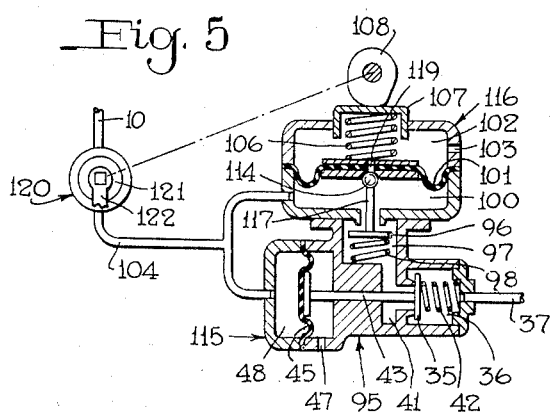
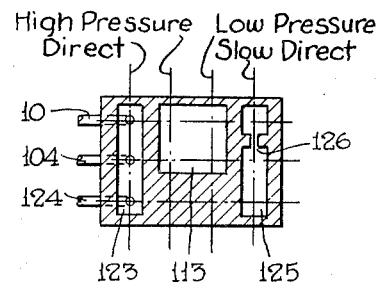
INVENTOR.
Joseph J. Lihota
BY
Adelbert A. Steinmiller
ATTORNEY United States Patent Office 2,861,844
Patented Nov. 25, 1958

2,861,844

BRAKE CYLINDER PRESSURE RETAINING AND MAINTAINING APPARATUS

Joseph J. Lihota, Verona, Pa., assignor to Westinghouse Air Brake Company, Wilmerding, Pa., a corporation of Pennsylvania Original application May 29, 1951, Serial No. 228,850, now Patent No. 2,760,830, dated August 28, 1956. Divided and this application October 28, 1955, Serial No. 543,334

7 Claims. (Cl. 303—75)

This invention relates to fluid pressure brakes and more particularly to means for retaining a chosen pressure of fluid in the brake cylinder devices on cars of a train while recharging the train brake system; this application being a division of my copending application, Serial No. 228,850, on which U. S. Patent 2,760,830 was granted on August 28, 1956.

In order to ensure safe control of railway trains while descending long grades where one or more brake applications may be required, manually adjustable retaining valve devices have long been employed on the cars to limit release of fluid under pressure from the brake cylinder devices on the cars for thereby maintaining the car brakes applied with limited force while the brake pipe and associated apparatus of the brake system are being recharged in preparation for a subsequent application of brakes. Leakage of fluid under pressure from a brake cylinder device will however defeat the purpose of a retaining valve device and the principal object of the invention is therefore the provision of improved means for offsetting such leakage so as to thereby ensure that the pressure in the brake cylinder device will remain at the desired selected reduced degree.

Other objects and advantages will become apparent from the following more detailed description of the invention.

Figure 1:
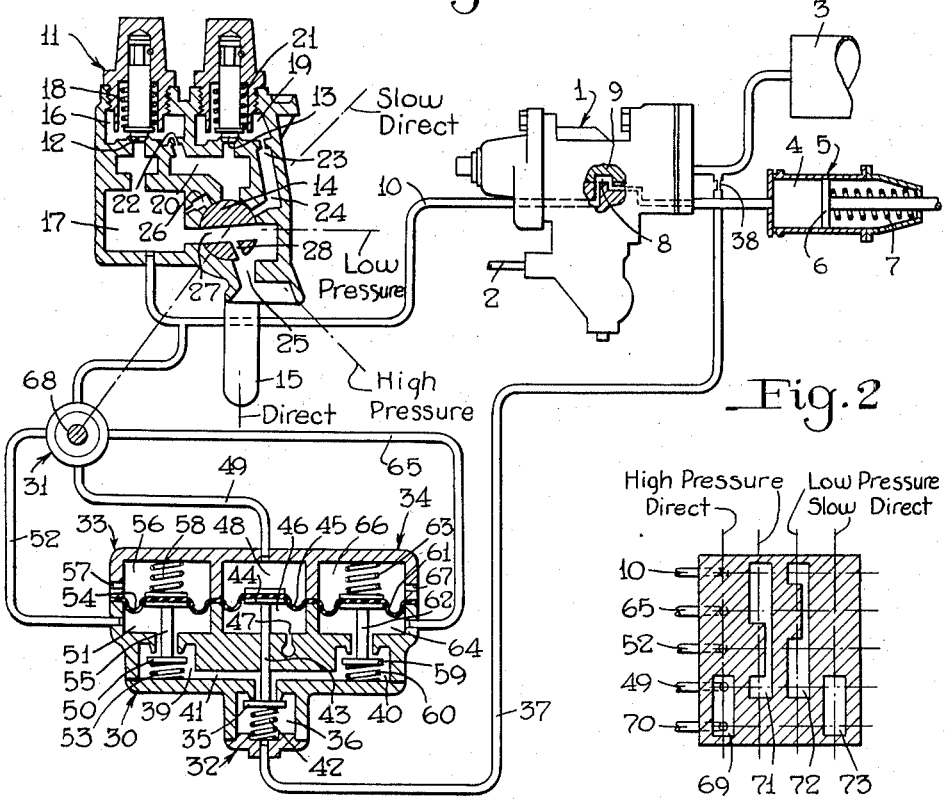
Figure 2:
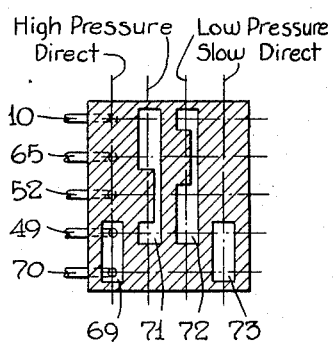

In the accompanying drawings; Fig. 1 is a diagrammatic view of a fluid pressure brake apparatus for a car embodying one form of the invention; Fig. 2 is a diagrammatic, development view of a valve constituting a part of Fig. 1; and Figs. 3, 4 and 5, 6 are views similar to Figs. 1 and 2, respectively, of different embodiments of the invention.

*Description—Figs. 1 and 2*

As shown in Fig. 1, the reference numeral 1 designates a brake controlling valve device of any conventional type which is adapted to respond to a reduction in pressure in a brake pipe 2 to supply fluid under pressure from a source of fluid under pressure such as may be present in an auxiliary reservoir 3 to the pressure chamber 4 of a brake cylinder device 5. In chamber 4 the pressure of fluid will act on a brake cylinder piston 6 to move said piston against a release spring 7 to apply brakes on a car, as well-known. Upon recharging the brake pipe 2 with fluid under pressure, the brake controlling valve device 1 will operate in the usual well-known manner to recharge the auxiliary reservoir 3 with fluid under pressure from said brake pipe and at the same time open the brake cylinder pressure chamber 4 through a cavity 8 in a slide valve 9 of said device to a retainer pipe 10 for releasing fluid under pressure from said chamber either completely or partially dependent upon the adjustment of a pressure retaining valve device 11.

For illustration, the pressure retaining valve device 11 may be like that disclosed in Patent No. 2,204,796 issued on June 18, 1940 to C. C. Farmer. Briefly, the retaining valve device 11 comprises a casing containing low and high pressure retaining check valves 12, 13, respectively, and a plug valve 14 which is rotatable manually by a handle 15 to four different positions indicated by lines to which are applied the legends "Direct," "High Pressure," "Low Pressure" and "Slow Direct," respectively.

The low pressure check valve 12 is contained in a chamber 16 and is arranged to control communication between said chamber and a chamber 17 to which the retaining pipe 10 is connected, a spring 18 in chamber 16 acting on said valve urging it toward its seat with a chosen force such, for example, as to require fluid at a pressure in chamber 17 ten pounds higher than that in chamber 16 to open or unseat said check valve.

The high pressure check valve 13 contained in a chamber 19 is provided to control communication between said chamber and a chamber 20 and is urged to its seat by a spring 21 in chamber 19 with a force which may be the same as that of spring 18 on the low pressure check valve 12. Chamber 20 is open through a choke 22 to chamber 16 and chamber 19 is open through a choke 23 to a passage 24 leading to one side of the plug valve 14.

Also opening to the side of the plug valve 14 are chambers 17 and 20, an atmospheric exhaust port 25 and one end of a restricted passageway 26 the opposite end of which is open to chamber 17.

Now assume that subsequent to effecting an application of brakes by supplying fluid under pressure to chamber 4 in the brake cylinder device 5, the parts of the triple valve device 1 have been moved back to release position for recharging the auxiliary reservoir 3 and for opening said chamber to the retaining pipe 10 and thence to chamber 17 in the pressure retaining valve device 11. With the handle 15 in "Direct" position, a passageway 27 in plug valve 14 will open chamber 17 to the direct release passage 25 whereupon fluid under pressure will be released from the brake cylinder pressure chamber 4 directly to atmosphere at the usual rate to provide for release of brakes on the car.

If the handle 15 is in "High Pressure" position, the passageway 27 in valve 14 will be disconnected from chamber 17 and open to passage 24 and a passageway 28 in said valve will connect passageway 27 to the exhaust passage 25, whereupon fluid under pressure from the retaining pipe 10 present in chamber 17 will lift the check valve 12 and flow to chamber 16 and thence to chamber 20 wherein it will act to unseat the check valve 13 and flow to chamber 19 and thence to atmosphere via passage 24, passageways 27, 28 in the plug valve 14 and the exhaust port 25. Thus, in the high pressure position of handle 15, fluid under pressure will be released from the brake cylinder pressure chamber 4 until the pressure retained in said pressure chamber will be equal to the combined pressures of springs 18, 21 on the respective check valves 12, 13 or, for example, twenty pounds.

If the handle 15 is in the "Low Pressure" position, passageway 27 in the plug valve 14 will open chamber 20 directly to the exhaust port 25; whereupon fluid released past the low pressure check valve 12 will escape directly to atmosphere and such will continue until the pressure in the brake cylinder pressure chamber 4 becomes reduced to a degree, such as ten pounds, which is insufficient to unseat the check valve 12, whereby the pressure of fluid retained in the brake cylinder pressure chamber 4 in this position of handle 15 will, for example, be ten pounds.

If the handle 15 is in the "Slow Direct" release position, the retainer pipe 10 will be open directly to atmosphere through chamber 17, the restricted passageway 26, passageway 27 in the plug valve 14 and the exhaust port 25 whereby complete release of fluid under pressure from the brake cylinder pressure chamber 4 will occur but at a slower rate than in the "Direct" position.

The structure and operation of the structure so far described is well-known. It is however to be noted that if there should be leakage of fluid under pressure from the brake cylinder pressure chamber 4 past the piston 6 the pressure in said chamber will undesirably reduce after closing of the valves 12, 13 in the "High Pressure" or "Low Pressure" positions of the retainer valve handle 15 and such is undesirable since a brake application may become completely released or reduced either of which is undesirable from the standpoint of safety of a train. The invention, which will now be described, provides for maintaining the pressure in the brake cylinder pressure chamber 4 at the pressure corresponding to the "High Pressure" position or "Low Pressure" position of handle 15 while recharging the brake system on a car or train of cars.

According to the invention, as shown in Figs. 1 and 2, I associate with the brake apparatus, so far described, a pressure maintaining valve device 30 and a selector valve device 31.

The valve device 30 comprises a supply valve device 32, a low pressure maintaining valve device 33 and a high pressure maintaining valve device 34.

The supply valve device 32 comprises a supply valve 35 contained in a chamber 36 which is adapted to be constantly supplied with fluid under pressure from any suitable source, such as the auxiliary reservoir 3, via a pipe 37 in which there is placed a choke or restriction 38. The valve 35 is provided for controlling flow of fluid under pressure from chamber 36 to two chambers 39 and 40 via a connecting passage 41 and is urged to a closed position by a spring 42 for preventing such flow. A stem 43 slidably mounted in a suitable bore in the casing of the device has one end engaging the seating side of valve 35 while the opposite end terminates in a follower head 44 engaging one side of a flexible diaphragm 45 in a chamber 46 at one side of the diaphragm. Chamber 46 is open to atmosphere through a port 47. At the opposite side of diaphragm 45 is a control chamber 48 open to a pipe 49 leading to the selector valve device 31. Upon supply of fluid under pressure to chamber 48 (as will be later described) the diaphragm 45 is adapted to deflect to operate stem 43 to open valve 35 for supplying fluid under pressure to chambers 39 and 40, while upon release of fluid under pressure from chamber 48 spring 42 is adapted to close valve 35.

The low pressure maintaining valve device 33 comprises a maintaining check valve 50 contained in chamber 39 for controlling communication between said chamber and a chamber 51 open to a pipe 52 leading to the selector valve device 31; a spring 53 in chamber 39 acting on said valve for normally closing it and thereby said communication. Chamber 51 is provided at one side of a flexible diaphragm 54 which is connected by a stem 55 to the seating side of valve 50. At the opposite side of diaphragm 54 is a chamber 56 in constant communication with atmosphere via a vent 57 and containing a spring 58 acting on the diaphragm with such force as to deflect it to unseat valve 50 when opposing pressure of fluid in chamber 51 in just slightly less than that (ten pounds) at which the check valve 12 seats in the "Low Pressure" position of the retaining valve handle 15. The high pressure maintaining valve 34 is like the low pressure maintaining valve device 33 in that it comprises a maintaining check valve 59 normally urged to a closed position by a spring 60 both of which are contained in chamber 40, a flexible diaphragm 61 connected to valve 59 through a stem 62 and a spring 63 acting on said diaphragm for unseating said valve when pressure of fluid in a chamber 64 at one side of said diaphragm is just slightly less than that (twenty pounds) at which both check valves 12 and 13 seat in the "High Pressure" position of the retaining valve handle 15. The valve 59 is provided to control flow of fluid under pressure from chamber 40 to chamber 64 which is connected to a pipe 65 leading to the selector valve device 31. At the opposite side of diaphragm 61 is a chamber 66 containing spring 63 and open to atmosphere through a vent 67.

The selector valve device 31 comprises a casing to which the pipes 10, 49, 52 and 65 are connected and a plug valve 68 mounted in said casing and arranged to turn with the plug valve 14 in the retaining valve device 11. In practice the plug valves 68 and 14 may, if desired, be one and the same valve.

In the "Direct" position of the retaining valve handle 15, in which the retainer pipe 10 is open directly to atmosphere through the relatively large passageway 27 to provide normal rate of release of fluid under pressure from the brake cylinder device 5, the connections of pipes 10, 52 and 65 to the selector valve device may be closed by the plug valve 68 while pipe 49 may be vented to atmosphere through a cavity 69 in the plug valve 68 and an exhaust port 70 in the casing thereof (Fig. 2). With pipe 49 and thereby diaphragm chamber 48 vented the supply valve 35 will be seated by spring 42 so that there can be no flow of fluid under pressure from the maintaining valve device 30 to pipe 10.

Now assume that the retaining valve handle 15 is in "High Pressure" position at the time of releasing fluid under pressure from chamber 4 in the brake cylinder device 5. In this position both check valves 12, 13 in the retaining valve device will seat when the pressure in the brake cylinder chamber 5 is reduced to a chosen degree such as twenty pounds. In this position of handle 15 and thereby of plug valve 68 of the selector valve device a cavity 71 (Fig. 2) in the plug valve opens the retaining pipe 10 to pipes 49, 65 whereby brake cylinder pressure will become effective in diaphragm chambers 48, 64 of maintaining valve device 30. If brake cylinder pressure chamber 4 is then charged with fluid under pressure, pressure of such fluid thus provided in chamber 48 will deflect diaphragm 45 to open valve 35 for thereby supplying fluid under pressure from the source (auxiliary reservoir 3) to valve chamber 40, while brake cylinder pressure in chamber 64 will deflect diaphragm 61 against spring 63 to permit closing of valve 59 by spring 60 as long as brake cylinder pressure equals or exceeds that at which the two check valves 12, 13 in the retaining valve device seat. After the check valves 12, 13 seat however, if leakage should reduce the pressure in the brake cylinder chamber 4 and thereby in diaphragm chamber 64 to a slightly lower degree, spring 63 will unseat valve 59 to permit fluid under pressure to flow from chamber 40 to brake cylinder device 5 to prevent pressure in chamber 4 reducing further due to leakage. The check valve 59 may be unseated, as just described, just sufficient to permit such flow of fluid under pressure to brake cylinder pressure chamber 4 as to compensate for the leakage, in which case it will remain open as long as retaining valve handle 15 is in the "High Pressure" position. On the other hand, when the valve 59 is opened inertia may cause it to open to a greater extent, in which case, fluid under pressure will be supplied to chamber 64 at a rate greater than necessary to compensate for leakage. The pressure in chamber 64 will then increase to a degree slightly greater than the opposing pressure of spring 63 on diaphragm 61 and deflect said diaphragm to permit closing of said valve. Leakage will then again reduce the pressure in chamber 64 in response to which the valve 59 will again be opened. It is immaterial whether the valve 64 thus opens and closes or obtains a position upon opening to just compensate for leakage for, from practical standpoint, the pressure in the brake cylinder pressure chamber 4 will remain substantially at the pressure corresponding to the "High Pressure" position of handle 15.

If retaining valve handle 15 should be in "Low Pressure" position at the time the charged brake cylinder pressure chamber 4 is opened to retainer pipe 10, a cavity 72 in the plug valve 68 will open pipe 10 to pipes 52 and 49, whereby the supply valve 35 will be opened to supply fluid under pressure to valve chamber 39 and the low pressure maintaining valve device 33 will then operate the same as the high pressure maintaining valve device 34 operated, as above described, in case of leakage of fluid under pressure from the brake cylinder pressure chamber 4 to maintain the pressure therein substantially equal to that (ten pounds) present at the time of seating of the check valve 12 in the retaining valve device, as will be evident without detailed description.

If handle 15 should be in the "Slow Direct" position at the time of connecting the charged brake cylinder pressure chamber 4 to the retainer pipe 10, the plug valve 68 will lap pipes 10, 65 and 52 and vent pipe 49 via cavity 73 therein so as to prevent operation of the maintaining valve device 30, the same as in the "Direct" position of handle 15.

It will now be seen that in the "Low Pressure" and "High Pressure" position of handle 15, retaining valve device 11 will operate in the usual manner to permit reduction in pressure in the charged brake cylinder pressure chamber 4 to the respective reduced degree, and that in case of leakage of fluid under pressure from said chamber, the pressure therein will be maintained against leakage substantially at the desired reduced degree by the maintaining valve device 30. In the "Direct" and "Slow Direct" positions of handle 15 the maintaining valve device 30 will be cut out of operation at times, it will be noted, when retention of a certain pressure in the brake cylinder pressure chamber 4 is not desired.

Figure 3:
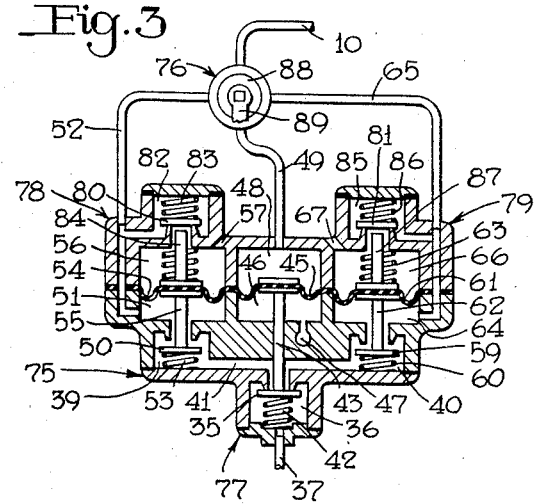
Figure 4:
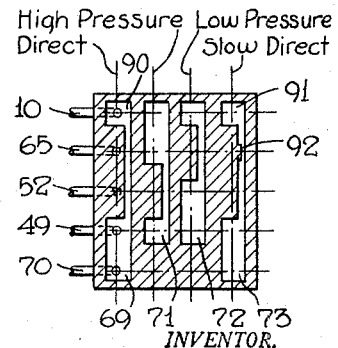

*Description—Figs. 3 and 4*

If desired, the functions of the usual pressure retaining valve device 11 and pressure maintaining valve device 30 shown in Fig. 1, may be combined into a single retaining and maintaining valve device 75, shown in Fig. 3, arranged to be controlled by a selector valve device 76.

The valve device 75 comprises a supply valve device 77, a low pressure retaining and maintaining valve device 78 and a high pressure retaining and maintaining valve device 79 and is like the maintaining valve device 30 shown in Fig. 1 except for the addition of retaining check valves 80 and 81 arranged for control by diaphragms 54, 61 of the valve devices 78, 79, respectively. Accordingly, the same reference numerals have been applied to corresponding parts in the two devices 30, 75.

The check valve 80 is contained in a chamber 82 open to pipe 52, and a spring 83 in said chamber is provided to seat said check valve which controls communication between said chamber and the atmospheric chamber 56. A stem 84 contained in chamber 56 with one end connected to diaphragm 54 has its opposite end disposed for engagement with the seating side of check valve 80 for unseating same by deflection of said diaphragm after the check valve 50 is seated. Similarly, the check valve 81 is contained in a chamber 85 open to pipe 65, and a spring 86 in said chamber is provided to seat said valve for closing communication from said chamber to the atmospheric chamber 66. A stem 87 in chamber 66 connected at one end to diaphragm 61 is provided to contact the check valve 81 and unseat same by deflection of said diaphragm after the check valve 59 is seated.

The selector valve device 76 comprises a casing to which are connected pipes 10, 49, 52 and 65, like the selector valve device 31, and which contains a plug valve 88. A handle 89 having the same positions as the retaining valve handle 15 of Fig. 1 is connected to plug valve 88 for turning it to corresponding positions. The plug valve 88 has the same cavities 69, 71, 72 and 73 (Fig. 4) as the plug valve 68 and in addition cavities 90, 91 open to cavities 69 and 73, respectively, the communication between cavities 91 and 73 including a choke 92 for performing the function of the restricted passageway 26 in the retaining valve device 11 of Fig. 1.

In operation, if selector valve handle 89 is in "Direct" position at the time fluid under pressure is released from the brake cylinder pressure chamber 4 to pipe 10, fluid under pressure will flow directly to atmosphere through cavities 90 and 69 in the plug valve 88 and exhaust port 70; pipes 65 and 52 being lapped by said valve, and pipe 49 being vented the same as in the structure shown in Fig. 1.

If the selector valve handle 89 is in the "High Pressure" position when fluid under pressure is released from the brake cylinder pressure chamber 4 to pipe 10, such fluid will flow through cavity 71 in the plug valve 88 to pipes 65 and 49. The supply valve device 77 will thereby be operated to open supply valve 35 to supply fluid under pressure to the valve chamber 40; and at the same time brake cylinder pressure from pipe 65 becoming effective in chamber 64 on diaphragm 61 of the high pressure valve device 79 will deflect said diaphragm against spring 63 to open valve 81. With the valve 81 thus open fluid under pressure will be vented from the brake cylinder device and diaphragm chamber 66 to atmosphere via chamber 66 and vent 67 until such pressure becomes reduced to the chosen degree, such as twenty pounds, at which spring 63 will deflect diaphragm 61 downward to permit spring 86 to seat valve 81 for thereby terminating release of fluid under pressure from the brake cylinder chamber 4. If now there is leakage of fluid under pressure from the brake cylinder pressure chamber 4, the resultant reduction in pressure in chamber 64 will cause the diaphragm 61 to open the supply valve 59 to supply fluid under pressure to said chamber to compensate for such leakage, the same is in the structure shown in Fig. 1.

If selector handle 89 is in "Low Pressure" position at the time the charged brake cylinder pressure chamber 4 is opened to pipe 10, said pipe will be opened by cavity 72 in the selector valve 88 to pipes 52 and 49 whereby the supply valve 35 will be opened and the low pressure valve device 78 will be operated to permit release of fluid under pressure from said chamber via valve 80 until such pressure is reduced sufficiently to permit deflection of diaphragm 54 by spring 58 and thereby closure of valve 80, and finally in case of leakage of fluid under pressure from the brake cylinder chamber 4, opening of valve 50 to compensate for leakage, as will be readily apparent from previous description.

If selector handle 89 is in "Slow Direct" position when the charged brake cylinder pressure chamber 4 is opened to pipe 10, fluid under pressure will be vented from said chamber via cavity 91 in the plug valve, choke 92, cavity 73 and exhaust port 70; while pipes 65 and 52 will be lapped by said valve and pipe 49 will also be vented by way of exhaust port 70; so that the valve device 75 will not operate to either limit release of fluid under pressure from the brake cylinder device or to supply fluid under pressure thereto, thereby providing the same result as the structure of Fig. 1 provides in the corresponding position of handle.

It will now be seen that the valve device 75 of Fig. 3 will provide the same result as the retaining valve device 11 and valve device 30 of Fig. 1.

*Description—Figs. 5 and 6*

If desired, the retaining valve device 11 of Fig. 1 may be dispensed with and the function thereof embodied in a retaining check valve 114 of a combined retaining and maintaining valve device 115 shown in Fig. 5. The device 115 comprises a supply valve device 95 and a maintaining valve device 116.

The supply valve device 95 may be the same in structure and operation as the supply valve devices 32 and 77 previously described, and the same reference numerals have therefore been applied to like parts.

The maintaining valve device 116 comprises a maintaining check valve 96 contained in a chamber 97 open to passage 41 and thus adapted to be supplied with fluid under pressure when valve 35 is open. A spring 98 acts on valve 96 to urge it seated. A stem 117 at one end engages the seating face of valve 96 for unseating it. The stem 117 extends into a chamber 100 at one side of a flexible diaphragm 101, at the opposite side of which is a chamber 102 open to atmosphere through a vent 103. The stem 117 at the opposite end has the valve 114 which is arranged to open and close communication between chamber 100 and a passageway 119 opening through diaphragm 101 to atmospheric chamber 102. The chamber 100 and chamber 48 in the supply valve device 95 are both connected to a pipe 104 leading to a selector valve device 120. In chamber 102 a control spring 106 has one end bearing on the diaphragm 101 while the other end bears against a plunger 107 slidably mounted in a suitable bore in the casing of the device. By adjustment of plunger 107 in its bore the pressure of spring 106 on diaphragm 101 may be varied.

For adjusting the position of plunger 107 in its bore a cam 108 is provided for operation by a handle 122, similar to handle 89. The peripheral surface of cam 108 engages the plunger 107 and is so designed as to vary the displacement of plunger 107 against spring 106 and therefore the pressure of said spring against diaphragm 101 in proportion to the extent of movement of handle 122 from the "High Pressure" position to the "Low Pressure" position, or vice versa, providing maximum displacement in the "High Pressure" position and minimum displacement in the "Low Pressure" position.

The selector valve device 120 comprises a plug valve 121 adapted to be turned by the handle 122 to "Direct," "High Pressure," "Low Pressure" and "Slow Direct" positions, but handle 121 is also adapted to be adjusted to any desired position between the "High Pressure" and "Low Pressure" position. The plug valve 121 is provided with a cavity 123 for, in the "Direct" position of handle 122, opening pipe 10 directly to atmosphere via an exhaust port 124 (Fig. 6) to provide for usual release of fluid under pressure from the brake cylinder pressure chamber 4. Pipe 104 is also vented in this position via cavity 123 so that the supply valve 35 will be closed. The plug valve 121 also has a cavity 125 which in the "Slow Direct" position of handle will vent both pipes 10 and 104 via exhaust port 124, but a choke 126 is placed in said cavity to restrict exhaust from the retainer pipe 10 (but not from pipe 104) so as to provide for the slow release of fluid under pressure from the brake cylinder pressure chamber 4 like provided by the restricted passage 26 in the retainer valve device 11 (Fig. 1). The plug valve 122 also has a cavity 113 for connecting pipes 10 and 104 in the "High Pressure" and "Low Pressure" positions and all intermediate positions of handle 122.

In operation, if handle 122 should be in the "High Pressure" position when the charged brake cylinder pressure chamber 4 is connected to pipe 10, pressure of fluid from said chamber will become effective in chamber 48 to open the supply valve 35, and at the same time such pressure becoming effective in chamber 100 will deflect diaphragm 101 to permit seating of valve 96 by spring 98 and opening of the release valve 114. Fluid under pressure will then be released from the brake cylinder pressure chamber 4 past release valve 114 until reduced to a chosen pressure at which spring 106 will deflect diaphragm 101 into seating engagement with the release valve 114. If leakage from the brake cylinder pressure chamber 4 then continues to reduce the pressure therein and in diaphragm chamber 100, spring 106 will respond to deflect diaphragm 101 to open valve 96 for supplying fluid under pressure to said chambers to compensate for such leakage.

If the handle 122 should be in "Low Pressure" position at the time the charged brake cylinder pressure chamber 4 is connected to pipe 10 and diaphragm chamber 100, the pressure of fluid in said chambers will be reduced past the release valve 114 to the chosen degree determined by the cam adjustment of spring 106; whereupon said valve will be closed, and in case of leakage of fluid under pressure from said chambers, the diaphragm 101 will then operate to open the valve 96 for supplying fluid under pressure to said chambers to compensate for leakage.

Since the cam 108 is designed to vary the pressure of spring 106 on diaphragm 114 according to the position of handle 122 between the "High Pressure" and "Low Pressure" positions, if said handle should be in any position intermediate said positions the release valve 114 will be closed at a corresponding different pressure and, in case of leakage, it will be compensated for in a manner which will be apparent from the above description. The ability to thus retain any one of a number of different pressures in the brake cylinder pressure chamber 4 is desirable in that it not only provides for adjustment of handle 122 according to a grade being descended but also according to the weight of a car or the load carried by the car.

Operation of the novel arrangements constituting the three embodiments of the invention have now been described under conditions where the handles 15, 89 and 122 are already assumed to be in their respective recited positions. It is to be noted, however, that according to a feature of the invention, if handle 15, 89, or 122 is moved from its respective "Direct" or "Slow Direct" position to either its "High Pressure" or "Low Pressure" position while brakes are released and the brake cylinder pressure chamber 4 is consequently vented, the chamber 48 of the respective supply valve devices 32, 77, 95 will remain vented and hence the corresponding supply valve 35 will not be unseated. Hence, the handle 15, 89 or 122 may be set while the train is on level terrain, with brakes released, at the bottom of a mountain before the ascent; this being especially desirable when there is a tunnel or dangerous terrain at the crest of the mountain. Brake cylinder pressure will be retained and maintained according to the selected setting of the valve handle 15, 89 or 122 during and after release of the first brake application following movement of such handle to "High Pressure" or "Low Pressure" position (and in the case of handle 122 to any other position intermediate said "High Pressure" and "Low Pressure" positions). By way of contrast, with brake cylinder retaining and maintaining arrangements previously proposed, as soon as the handle is set to maintain brake cylinder pressure at a certain value, fluid under pressure will be immediately supplied from the maintaining source to the brake cylinder device and apply brakes to a degree corresponding to the brake cylinder pressure desired to be retained, if brakes are not already applied; and hence the retaining and maintaining apparatus cannot be preset in advantageous, nondangerous terrain, but must be set at the crest of the mountain so as not to impose an undesirable drag on the locomotive while ascending the mountain.

If this "presetting" feature is not desired, however, cost may be reduced by eliminating the supply valve devices 32 (Fig. 1), 77 (Fig. 3), and 95 (Fig. 5), and connecting pipe 37 directly to the chambers 39, 40 (Figs. 1 and 3) or chamber 97 (Fig. 5).

Summary

It will now be seen that I have provided means for holding pressure in the brake cylinder device on a car at a selected degree against leakage while recharging the brake apparatus on the car and hence in a train of such cars to better facilitate safe descent of a grade. The invention may constitute a device adapted to be associated with the usual pressure retaining valve device and therefore requiring only the function of maintaining or, if desired, it may also embody the blow-down function of the usual retaining valve device. Moreover, if desired, the device may be of a form to maintain the pressure in the brake cylinder device at any desired one of an infinite number of different pressures.

Having now described the invention, what I claim as new and desire to secure by Letters Patent, is:

1. Means for controlling pressure of fluid in the retainer pipe of a fluid pressure brake apparatus having a brake cylinder device which is adapted to be opened to said retainer pipe for effecting a release of brakes, said means comprising supply valve means, responsive to supply of fluid under pressure to one chamber to supply fluid under pressure to another chamber and responsive to release of fluid under pressure from said one chamber to cut off supply of fluid under pressure to said other chamber, a normally seated retaining check valve controlling release of fluid under pressure from a different chamber, a normally seated maintaining check valve controlling supply of fluid under pressure from said other chamber to said different chamber, a spring, movable abutment means controlled by pressure of said spring opposing pressure of fluid in said different chamber and operative to unseat said retaining check valve to effect release of fluid under pressure from said different chamber to a value corresponding to the pressure of said spring and operative to unseat said maintaining check valve to effect supply of fluid under pressure from said other chamber to said different chamber as required to balance the pressure of said spring, and operator-controlled valve means for either opening said retainer pipe to said one and different chambers or for venting said one and different chambers and retainer pipe directly to atmosphere.

2. Means for controlling pressure of fluid in the retainer pipe of a fluid pressure brake apparatus having a brake cylinder device which is adapted to be opened to said retainer pipe for effecting a release of brakes, said means comprising a control spring, movable abutment means subject to pressure of said spring opposing pressure of fluid in a chamber, valve means controlled by said movable abutment means for releasing fluid under pressure from and supplying fluid under pressure to said chamber as required to balance the pressure of said spring, other valve means for opening said retainer pipe to said chamber or to atmosphere, cam means for varying pressure of said spring on said movable abutment means, and a lever for concurrently controlling operation of said other valve means and cam means.

3. In a fluid pressure brake apparatus for a railway car, the combination of a brake pipe, brake means operable by fluid under pressure to effect an application of brakes and responsive to release of such fluid under pressure to effect a release of brakes, a retainer pipe, brake controlling means responsive to a reduction in brake pipe pressure to supply fluid under pressure to said brake means and responsive to a subsequent increase in brake pipe pressure to open said brake means to said retainer pipe, retaining and maintaining means comprising retaining valve means for releasing fluid under pressure from said retainer pipe, maintaining valve means for supplying fluid under pressure to said retainer pipe, a lever, and means operable by movement of said lever to various positions for providing concurrent control over operation of said retaining valve means and maintaining valve means, the last mentioned means being effective in some of said positions of said lever to cause said retaining valve means to effect release of fluid under pressure from said retainer pipe to different chosen values above atmosphere and also cause said maintaining valve means to concurrently limit the pressure of fluid which will be supplied to said retainer pipe to substantially the respective chosen value then effective, and other value means controlled by said lever and operable in said some positions of the lever to connect the retainer pipe to said retaining valve means and maintaining valve means operative in another position of said lever to open said retainer pipe to atmosphere in by-pass of said retaining valve means and maintaining valve means.

4. Means for controlling pressure of fluid in the retainer pipe of a fluid pressure brake apparatus having a brake cylinder device which is adapted to be opened to said retainer pipe for effecting a release of brakes, said means comprising operator-controlled valve means for selectively connecting the retainer pipe to a chamber or to atmosphere in by-pass of said chamber, a retaining check valve for controlling release of fluid under pressure from said chamber to atmosphere, a maintaining check valve for controlling supply of fluid under pressure to said chamber, resilient means, a movable abutment interposed between and arranged coaxially with said retaining check valve and said maintaining check valve, a pair of stems arranged at opposite sides of and coaxially with said movable abutment for controlling opening of said retaining check valve and maintaining check valve selectively by said movable abutment, said movable abutment being controlled by pressure of fluid in said chamber opposing pressure of said resilient means and operative to open said retaining check valve or said maintaining check valve through the medium of a corresponding one of said stems according to whether pressure in said chamber exceeds or is less than a chosen value corresponding to the pressure of said resilient means, thereby to provide in said chamber fluid at substantially said chosen value of pressure.

5. Means for controlling pressure of fluid in the retainer pipe of a fluid pressure brake apparatus having a brake cylinder device which is adapted to be opened to said retainer pipe for effecting a release of brakes, said means comprising supply valve means responsive to pressure of fluid in one chamber to supply fluid under pressure to another chamber and to venting of said one chamber to cut off such supply, retaining valve means controlling fluid pressure connection of a different chamber to atmosphere, maintaining valve means controlling fluid pressure connection of said other chamber to said different chamber, resilient means, fluid pressure motor means controlling both of said fluid pressure connections, said motor means being subject to opposing pressures of fluid in said different chamber and of said resilient means and operative to cause opening of one or the other of said fluid pressure connections according to whether pressure in said different chamber exceeds or is less than a chosen value corresponding to the pressure of said resilient means and to cause closure of both of said connections when pressure in said different chamber is substantially equal to said chosen value of pressure, and operator-controlled valve means for selectively connecting the retainer pipe to said one chamber and different chamber or connecting the retainer pipe to atmosphere in by-pass of said one and different chambers.

6. In a fluid pressure brake apparatus for a railway car, the combination of brake means operable by fluid under pressure to effect an application of brakes and responsive to release of such fluid under pressure to effect a release of brakes, a brake pipe, a retainer pipe, an auxiliary reservoir, brake control means responsive to a reduction in brake pipe pressure to supply fluid under pressure from said auxiliary reservoir to said brake means and responsive to a subsequent increase in brake pipe pressure to prevent such supply from said auxiliary reservoir to said brake means and open the latter to said retainer pipe, supply valve means responsive to pressure of fluid in one chamber to effect supply of fluid under pressure from said auxiliary reservoir to another chamber and responsive to venting of said one chamber to terminate such supply of fluid under pressure to said other chamber, retaining valve means for controlling release of fluid under pressure from a different chamber, maintaining valve means controlling supply of fluid under pressure to said different chamber from said other chamber, control spring means, movable abutment means subject opposingly to pressure of fluid in said different chamber and pressure of said control spring means for so controlling selective opening of said retaining and maintaining valve means as to normally provide in said different chamber fluid at a pressure required to balance the pressure of said control spring means, and selector means operable in one position to open said one and different chambers to said retainer pipe and in another position to open said retainer pipe and one and different chambers to atmosphere.

7. In a fluid pressure brake apparatus for a railway car, the combination of brake means operable by fluid under pressure to effect an application of brakes and responsive to release of such fluid under pressure to effect a release of brakes, a brake pipe, a retainer pipe, brake control means responsive to a reduction in brake pipe pressure to supply fluid under pressure to said brake means and responsive to a subsequent increase in brake pipe pressure to open said brake means to said retainer pipe, supply valve means responsive to pressure of fluid in one chamber to effect supply of fluid under pressure to another chamber and responsive to venting of said one chamber to terminate such supply of fluid under pressure to said other chamber, retaining valve means for controlling release of fluid under pressure from a different chamber, maintaining valve means controlling supply of fluid under pressure to said different chamber from said other chamber, control spring means, movable abutment means subject opposingly to pressure of fluid in said different chamber and pressure of said control spring means for so controlling selective opening of said retaining and maintaining valve means as to normally provide in said different chamber fluid at a pressure required to balance the pressure of said control spring means, cam means for adjusting the pressure of said control spring means, selector valve means operative in some positions to open the retainer pipe only to said one and different chambers and in other positions to open the retainer pipe and said one and different chambers to atmosphere, and an operator's control lever for concurrently controlling operation of said cam means and selector valve means.

References Cited in the file of this patent

UNITED STATES PATENTS

| | | |
|---|---|---|
| 1,012,720 | Sauvage | Dec. 26, 1911 |
| 1,447,791 | Kummerow | Mar. 6, 1923 |
| 1,892,261 | Wilson | Dec. 27, 1932 |